United States Patent [19]
Gougoulas

[11] Patent Number: 5,454,136
[45] Date of Patent: Oct. 3, 1995

[54] FORCED AIR VEHICLE DRYER AND PROXIMITY CONTROL SYSTEM THEREFOR

[76] Inventor: Harry K. Gougoulas, 1875 Philomine, Lincoln Park, Mich. 48146

[21] Appl. No.: 91,867

[22] Filed: Jul. 12, 1993

[51] Int. Cl.[6] .................................................... F26B 19/00
[52] U.S. Cl. ...................... 15/312.1; 15/316.1; 15/319; 34/666
[58] Field of Search ................................ 15/312.1, 316.1, 15/405; 34/243 C, 666

[56] References Cited

U.S. PATENT DOCUMENTS

| | | |
|---|---|---|
| 2,448,834 | 9/1948 | Rousseau . |
| 2,671,240 | 3/1954 | Bowman et al. . |
| 3,337,896 | 8/1967 | Allen . |
| 3,349,783 | 10/1967 | Ellis . |
| 3,559,659 | 2/1971 | Gougoulas . |
| 3,600,224 | 8/1971 | Stilwel . |
| 3,808,703 | 5/1974 | Kamiya . |
| 4,178,648 | 12/1979 | Gougoulas . |
| 4,418,442 | 12/1983 | Day et al. . |
| 4,561,193 | 12/1985 | Burger . |
| 4,562,848 | 1/1986 | Messing et al. . |
| 4,587,688 | 5/1986 | Gougoulas . |
| 4,700,426 | 10/1987 | mcElroy . |
| 4,848,670 | 7/1989 | Belanger . |
| 4,865,058 | 9/1989 | Crotts et al. . |
| 4,872,238 | 10/1989 | Crotts . |
| 4,934,018 | 6/1990 | Fortier et al. ........................ 15/319 X |
| 4,949,423 | 8/1990 | Larson et al. ........................ 15/316.1 |
| 4,969,272 | 11/1990 | Schleeter . |
| 4,979,316 | 12/1990 | Belanger et al. ................... 15/316.1 X |
| 4,991,316 | 2/1991 | Crotts . |
| 4,995,136 | 2/1991 | Smith ................................ 15/316.1 X |
| 5,098,023 | 3/1992 | Burke . |
| 5,280,665 | 1/1994 | McElroy et al. ................... 15/316.1 X |

Primary Examiner—Christopher K. Moore
Attorney, Agent, or Firm—Young, MacFarlane & Wood

[57] ABSTRACT

A non-contacting forced air dryer mechanism for vehicle laundering operations wherein the nozzles move rectilinearly relative to the vehicle surfaces and under the control of a sonar transducer which detects the vehicle surface and measures the distance between the vehicle surface and the outlets of the air nozzles. The control system is applied to both vertical and horizontal nozzles. The position control system is preferably a scissors mechanism which can be activated by means of a hydraulic cylinder. The top nozzle is preferably divided into a series of hollow tubular sections to permit the passage of vehicle antennae and mirrors. The side nozzle can be divided and arranged for progressive actuation to accommodate vehicles of varying height.

14 Claims, 4 Drawing Sheets

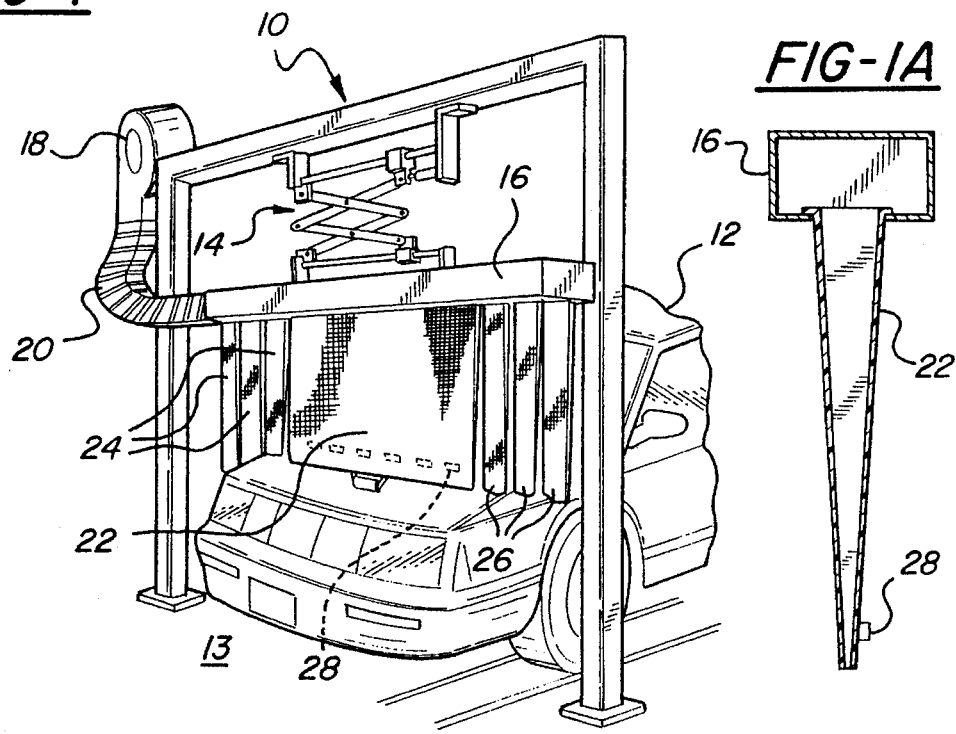
FIG-1
FIG-1A
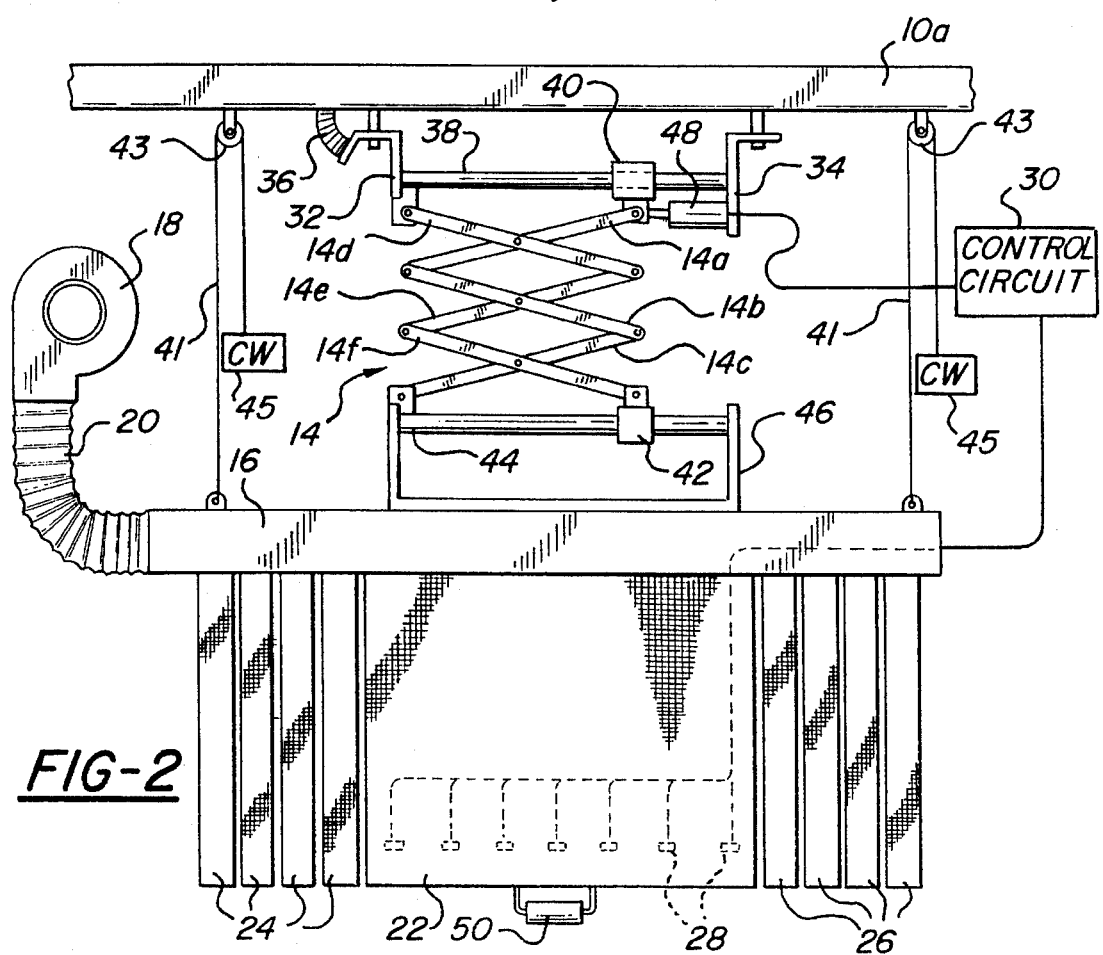
FIG-2

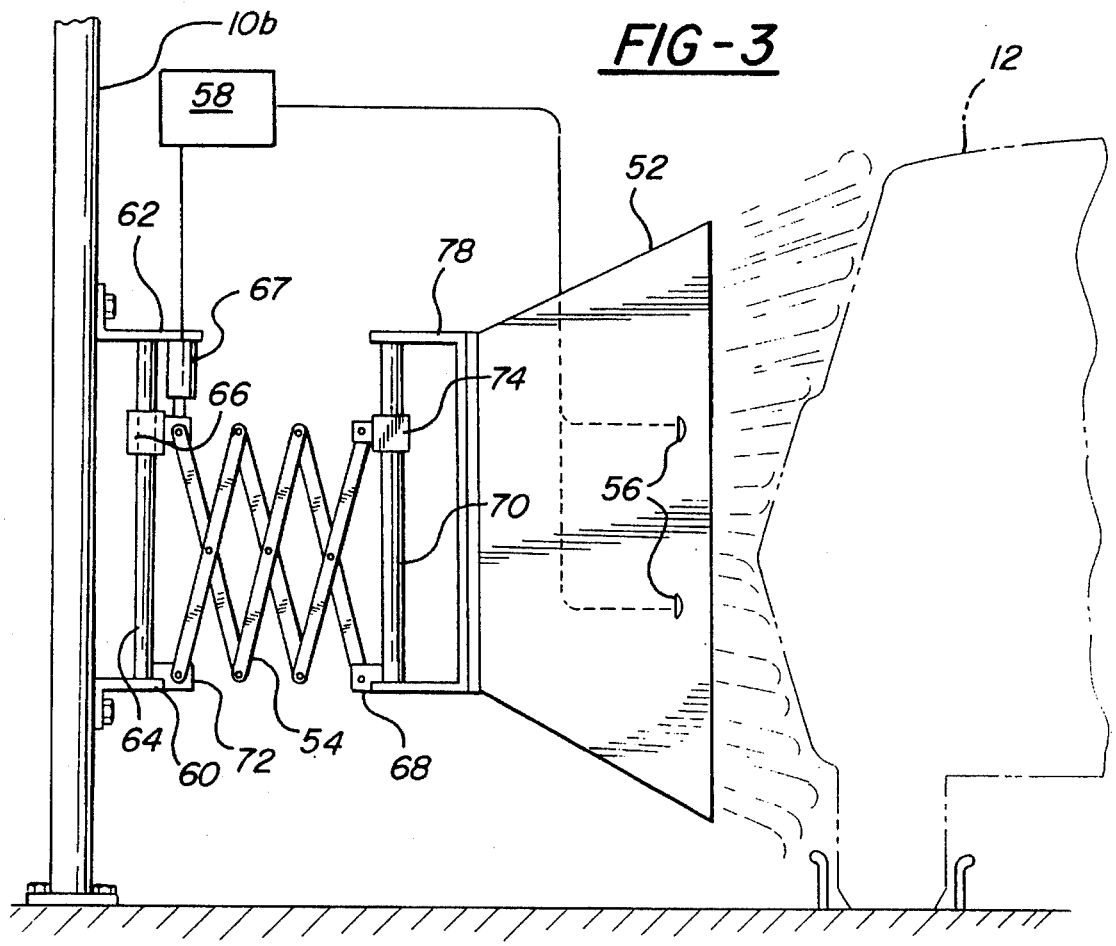
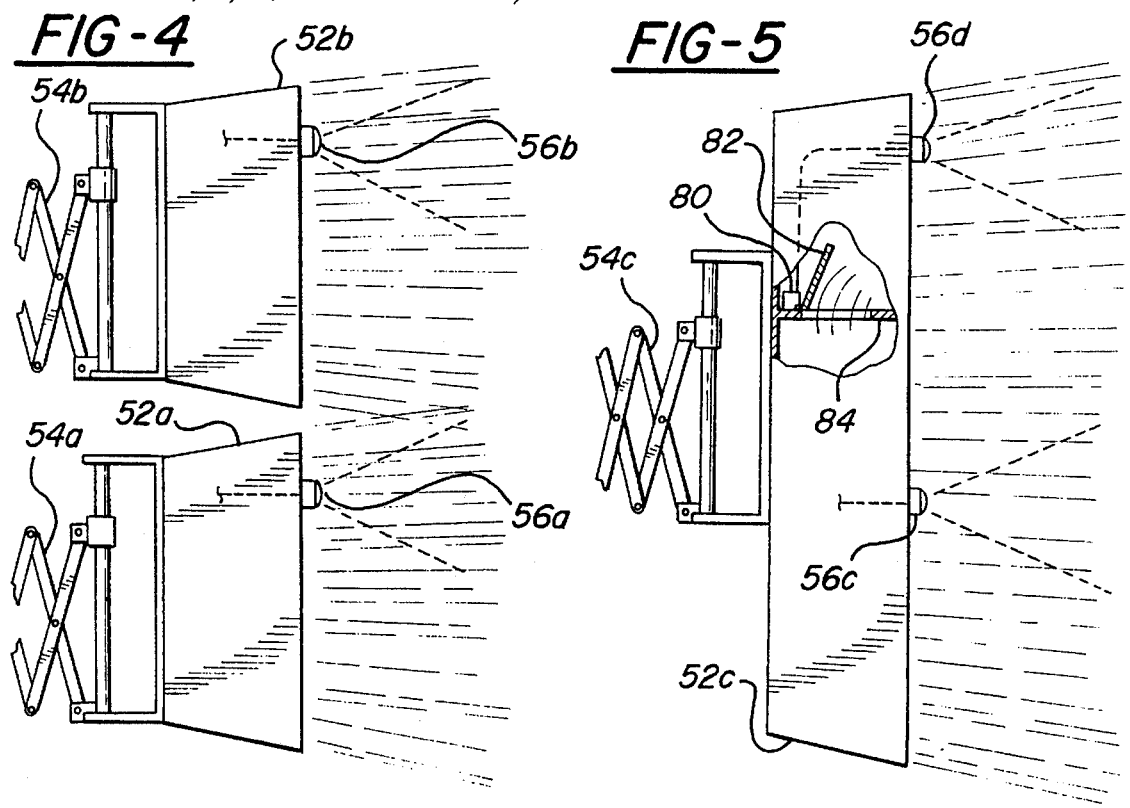

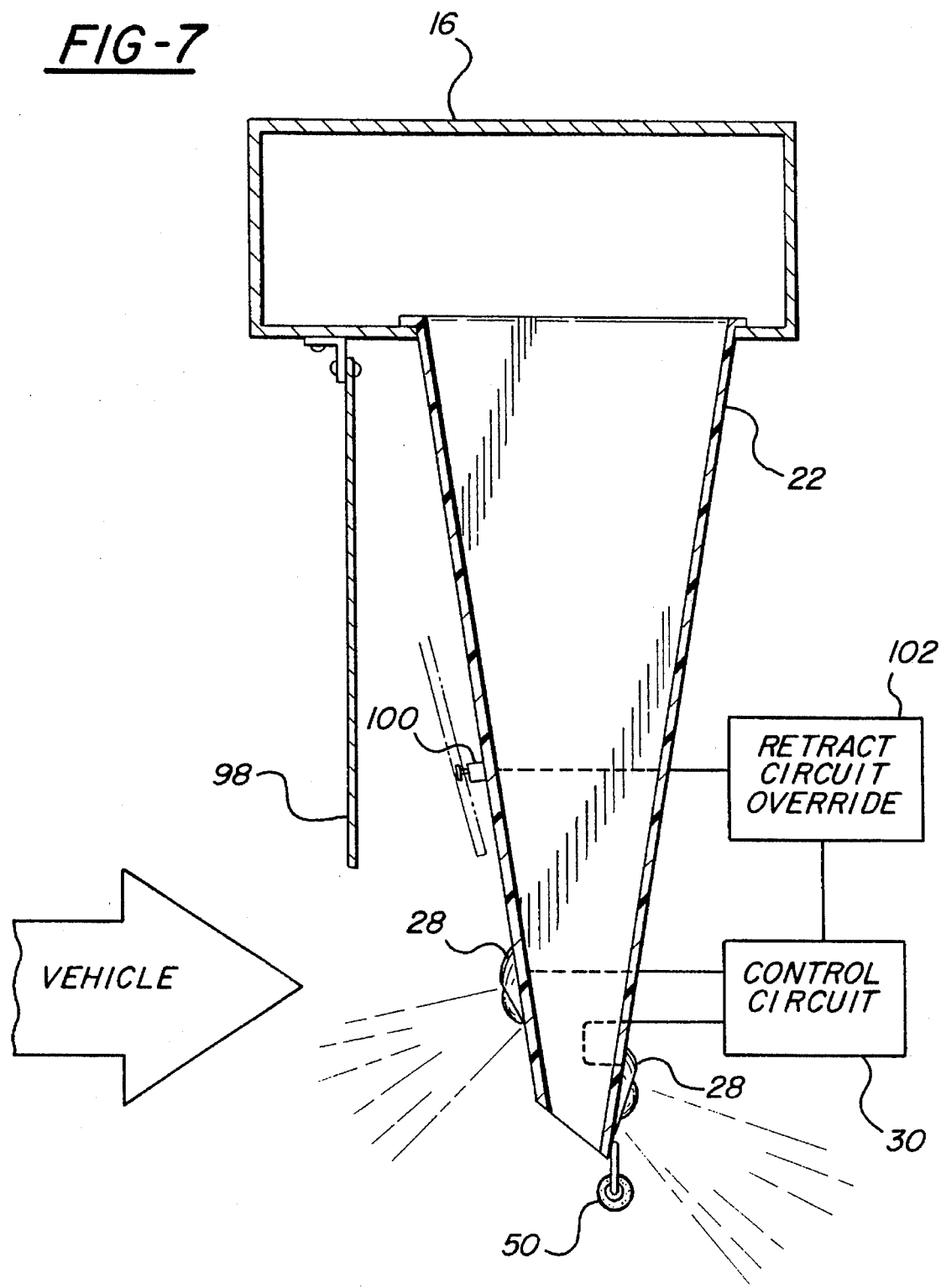

FORCED AIR VEHICLE DRYER AND PROXIMITY CONTROL SYSTEM THEREFOR

FIELD OF THE INVENTION

My invention relates to an apparatus for automatically or semi-automatically laundering vehicles such as automobiles and more particularly to an improved system for directing one or more streams of forced air onto the washed surfaces of the vehicle for the purpose of removing water drops and water sheets.

BACKGROUND OF THE INVENTION

Through my U.S. Pat. No. 4,587,688, I introduced the concept of a non-contacting dryer using a sonar-type proximity detector to control the position of an air nozzle relative to the surface of a wet vehicle after a laundering operation. My patented sonar-type proximity detector is distinguished from prior art proximity detectors used then and now in vehicle laundering systems in that the sonar transducer emits a signal toward the surface of the vehicle and receives a reflection from that surface as an essential part of its operation. The prior art systems for achieving touchless proximity detection and control of dryer components were typically of the electric-eye type in which the transducer system comprises discrete transmitter and receiver components which are aimed at one another across the wash lane. When the vehicle interrupts the optical transmission between the transmitter and the receiver, the system is set up to move the controlled component through a distance increment; if the optical transmission path is reestablished, the controlled element is deemed to be in a satisfactory position; if the transmission path is not reestablished, the controlled element is moved through another increment.

The embodiment of my invention disclosed in U.S. Pat. No. 4,587,688, the disclosure of which is incorporated herein by reference, includes a sonar transducer mounted on a relatively long nozzle support arm, one end of which is pivotally mounted overhead the vehicle and the other end of which carries the dryer nozzle. Because the pivot arm and the sonar transducer mounted on that arm move through an arc rather than a rectilinear path, some attention must be given to the matter of maintaining the proper aiming angle of the transducer toward the detected vehicle surface. By way of example, the proper aiming angle may be achieved by pivotally mounting the transducer on the arm itself or by using a transducer arrangement which produces a wide angle of sensitivity.

BRIEF STATEMENT OF THE INVENTION

It is my objective and a first aspect of my invention to essentially simplify the transducer aiming requirements by providing, for what I believe is the first time, the combination of a sonar-type proximity detector with a nozzle or nozzle system which moves rectilinearly relative to the vehicle surface; i.e., in a straight line rather than through an arc. By using this combination, I essentially eliminate the need for concern over transducer aiming angles.

In the preferred form and according to a second aspect of my invention, the rectilinear movement of a dryer nozzle or system of dryer nozzles, either overhead or side nozzles, is achieved through the use of a mechanical scissors-type extensor mechanism comprising a series of mechanical links or arms arranged in an overlapping zig-zag fashion and pivotally connected to one another at the crossing points. I achieve extension and retraction of the scissors arms by connecting the input end of one arm in the pair to a hydraulic cylinder which moves the arm at right angles to the extrusion direction. This has the effect of advancing and retracting the dryer nozzle at the distal end of the scissors mechanism in precisely controlled amounts.

In accordance with a third aspect of my invention, I disclose a number of guard mechanisms which prevent accidental contact between a vehicle and the extension mechanism and/or the nozzle which is positioned thereby. In the preferred form, my guards comprise a series of light plastic boxes which are mounted in progressive telescopic relationship with one another to completely cover the links with a soft plastic material which is not likely to be injurious to the surface of an automobile if accidental contact is made.

According to a fourth aspect of my invention, I provide an improved top nozzle system comprising, in the preferred form, a relatively wide, hollow, tapered center nozzle. The center nozzle is deep in the fore and aft direction at the top and tapers to a narrow depth at the bottom. The nozzle is preferably made of a thin but airtight material such as plastic or rubber so as to have substance and weight to promote proper hanging but softness to prevent damage upon accidental contact with the vehicle surface. Flexibility is not essential and, therefore, the nozzle may be made of a light metal such as aluminum or a plastic such as polyethylene or PVC. If a light metal is used, it should be coated with a material to prevent damage upon accidental contact with the vehicle surface. In the preferred form, I combine this relatively wide center nozzle with a series of parallel side nozzles which are only about 1 to 4 inches in width but, like the large center nozzle, taper to a very shallow bottom. This permits appendages of the vehicle such as antennae and mirrors to easily pass between the parallel side nozzles to avoid inadvertent damage. Both the center nozzle and the side nozzles are hollow and have the air outlets arranged in essentially a straight line transverse of the longitudinal axis of the vehicle so as to emit air onto and over the vehicle surface.

According to a fifth aspect of my invention, I provide for the effective increase in the size of the air stream emitted from a nozzle arrangement according to the sensed dimension of a vehicle to be dried. For example, it may be desirable to increase the height of a side nozzle air stream when a tall vehicle such as a van is in the wash lane. This can be accomplished by establishing a "normal" nozzle outlet dimension of one size and effectively increasing the height of the nozzle outlet when a second sensor detects the presence of a tall vehicle. Nozzle outlet size may be varied by baffles in a single nozzle or by the provision of a second nozzle unit.

According to a sixth aspect of my invention, I provide additional protection systems which act to move the dryer system away from the vehicle if accidental contact occurs. One such protection system uses a touch plate which extends downwardly between the nozzles and the vehicle. If contacted by the vehicle, the touch plate is pushed against a microswitch mounted to the nozzle. When the microswitch is contacted by the touch plate, the dryer is raised to the fully retracted position. An additional protection system provides a breakaway mounting mechanism which allows the dryer system to pivot away from the vehicle if the other protection systems fail and accidental vehicle contact occurs.

As will be apparent from a reading of the following specification, I disclose my invention and the various aspects thereof in one or more preferred embodiments including top nozzles and side nozzles of various configurations adapted to accommodate vehicles of different types and sizes. While I disclose my invention in an environment which anticipates movement of vehicles between stations of a wash lane from, for example, a wetting station to a washing station and thereafter to a drying station, my invention is susceptible of use in stationary and roll-over washers or dryers wherein movement between the laundering mechanism and the vehicle is achieved by moving a gantry frame along a track or by other means. Accordingly, the term "wash lane" as it is used in the following specification is to be understood and construed in a broad and general sense and not in the narrow sense which implies only a vehicle which is pushed through a wash lane by means of a conveyor or the like.

BRIEF DESCRIPTION OF THE DRAWING

FIG. 1 is a perspective view of a top nozzle control system using sonar positioning, multiple hanging nozzles and a scissors-type extension and retraction system for an air plenum feeding the nozzles;

FIG. 1a is a detailed view of the tapered nozzle of FIG. 1;

FIG. 2 is a front view of the mechanism for controlling the position of the top nozzle shown in FIG. 1;

FIG. 3 is a schematic diagram of a first side nozzle control system also utilizing a scissors-type extension and retraction mechanism and sonar positioning;

FIG. 4 is a schematic side view of a second side nozzle system using sonar detectors wherein the side nozzle is divided for purposes of accommodating higher than normal vehicles;

FIG. 5 is another schematic side view of a side nozzle system using a scissors-type extension and retraction mechanism and employing an internal baffle for accommodating vehicles of greater than normal height;

FIG. 7 is a schematic view of a backup vehicle protection system which may be employed to cause automatic retraction of, for example, a top nozzle upon failure of the primary sonar proximity detection and position control system.

DETAILED DESCRIPTION OF THE ILLUSTRATIVE EMBODIMENTS

Figure 6:
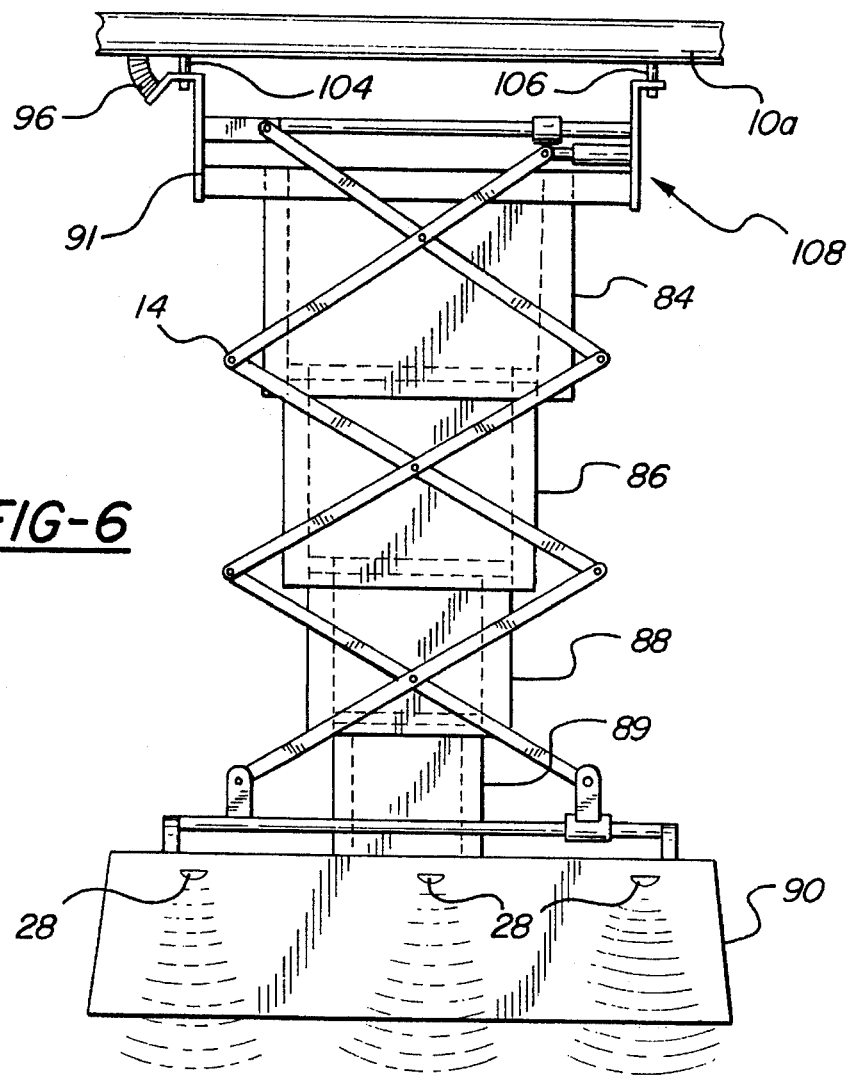
FIG. 6 is a front partial view of the preferred telescopic box guard system for covering the nozzle extension and retraction mechanism for protection of the vehicle surfaces.

Referring to FIGS. 1 and 2, a rigid steel gantry frame 10 defines a drive through arch for a vehicle 12 being pushed along a wash lane 13 by conventional roller conveyor means, not shown. Note that FIGS. 1 and 2 are not drawn to scale. Positioning means in the form of a mechanical extensor 14 is connected between a metal plenum 16 and the top beam of the gantry frame 10 to control the vertical position of plenum 16 relative to the upper surfaces of vehicle 12. Air is supplied to the plenum 16 by a blower 18 through flexible ducting 20.

Depending from and connected to receive air from the plenum 16 are a plurality of hollow, tapered nozzles 22, 24 and 26 arranged across the drying station to a width of approximately 72 inches. Nozzle 22 is mounted centrally of the arrangement and has a total width of approximately 50 inches. The width of the nozzles 24 and 26 is on the order of two inches. The depth of the nozzles 22, 24 and 26 at the top of the nozzle is approximately half the depth of the plenum 16. The depth of the nozzles 22, 24 and 26 at the bottom of the nozzle is approximately ½ inch. The tapering of the nozzle reduces the air pressure drop through the nozzle. The spacing between the nozzles is preferably no more than about ¼ of an inch. The inlet ends of the hollow nozzles are connected to receive air directly from the plenum 16; the outlet ends are arranged in essentially a straight line extending across the drying station between the vertical portions of the gantry frame 10. The positions of the outlet ends of the nozzles may be adjusted vertically through a travel of approximately 50 inches by means of positioning mechanism 14.

Nozzles 22, 24 and 26 are preferably constructed of a relatively soft plastic material such as polyethylene with a density sufficient to weight the nozzles so that they do not fly about as air is forced through them, but soft enough to prevent marring of a vehicle surface should incidental contact occur. Nozzles 24 and 26 are flexible enough to swing fore and aft and side to side should either of the side sections 24 or 26 contact vehicle appendages such as antennas and mirrors. The fact that the side sections 24 and 26 are split allows antennas and mirrors to pass easily through the nozzles.

Position control is achieved by means of sonar transducers 28 mounted on the center section 22 of the nozzle curtain. Although this embodiment of the invention has transducers 28 mounted to nozzle 22, it should be understood that the invention can function properly with the transducers mounted in alternate locations; e.g., on plenum 16. As best shown in FIG. 7, certain transducers are aimed downwardly and slightly rearwardly toward the vehicle top surfaces; i.e., toward the approaching vehicle. Other transducers are aimed downwardly and slightly forwardly toward the vehicle top surfaces to prevent the nozzle system from coming down on the back of the vehicle. The transducers, which may be of the type disclosed in my aforesaid patent, transmit a signal quantity toward the vehicle and receive a reflection thereof. The time lapse between the emission and reception of the signal is a measurement between the transducer and the vehicle surface and may be used in the manner described in my aforesaid patent to control the position of the dryer curtain so that a very close but non-contacting proximity between the nozzle outlets and the vehicle surface is maintained at all times. Such close contact is desirable to maximize the effect of the air stream in removing water while reducing the size and power requirements for the blower motor. This is achieved by connecting the output signal quantities of the transducers 28 to a control circuit 30 which in turn is connected to a hydraulic cylinder 48 in the positioning mechanism 14 to control the vertical position of the dryer curtain consisting of nozzles 22, 24 and 26 in the manner hereinafter described.

Referring specifically to FIG. 2, the positioning mechanism 14 is mounted to the top beam 10a of the gantry frame 10 by means of brackets 32 and 34 and, if desired, by means of a spring biased breakaway pivot 36 which permits the entire assembly to swing upwardly relative to the vehicle in emergencies. A flat 1×2 inch chrome steel bar 38 is mounted horizontally between the brackets 32 and 34 to provide a travel path for a brass bushing 40, the position of which is controlled by the hydraulic cylinder 48. The positioning mechanism 14 consists of metal arms 14a, 14b, 14c, 14d, 14e and 14f connected between the bar 38 and a similar parallel bar 44 mounted between the extending arms of a bracket 46 secured such as by bolts or welding to the top of plenum 16. One side of the extensor mechanism comprising arms 14a, 14b and 14c is connected between the bushing 40 at one end and a fixed point on bar 44 at the other end. The other side of the extensor mechanism consisting of arms 14d, 14e and 14f is connected between a fixed point on the bar 38 and bushing 42 on bar 44. All of the positioning mechanism's arms or links are pivotally connected at their crossing points. Accordingly, actuating the hydraulic cylinder 48 to displace the bushing 40 to the left as shown in FIG. 2 tends to extend the scissors and lower the plenum 16 and the associated nozzles 22, 24 and 26. Actuating the hydraulic cylinder 48 to pull the bushing 40 to the right as shown in FIG. 2 retracts the scissors mechanism and raises the dryer curtain consisting of nozzles 22, 24 and 26. Two counterweights 45 are provided to assist with raising and lowering the dryer curtain. The counterweights use a cable 41 mounted at one end to plenum 16. The cable is operatively connected to a pulley 43 which is mounted to the top beam 10a of gantry frame 10. The counterweight 45 is suspended from the free end of cable 41. The counterweight system reduces the force required by hydraulic cylinder 48 to raise and lower the dryer curtain. Alternatively, a single counterweight and associated cable and pulley may be located in the middle of plenum 16, near bracket 46.

When properly calibrated and tuned, the feedback control circuit consisting of transducers 28, circuit 30 and hydraulic cylinder 48 is effective to maintain a close but non-contacting spacing between the outlet ends of the nozzles 22, 24 and 26 and the top surfaces of vehicle 12.

It will be understood that various mechanisms are preferably employed for the purpose of avoiding or minimizing the adverse effects of vehicle contact in the event of a failure of the sonar positioning control system. For example, a series of rollers 50 of conventional design may be mounted on the lower end of nozzle 22 to permit the nozzle to roll harmlessly over the hood, windshield, top, backglass and deck surfaces of vehicle 12.

Referring now to FIG. 3, the details of a first embodiment of the invention as employed in the position control of a nozzle 52 for drying the sides of a vehicle will be described. A blower and plenum similar to those shown in FIG. 1 distribute air to nozzle 52.

Brackets 60 and 62 are mounted on a vertical post 10b which is anchored to the foundation adjacent the vehicle wash lane. Connected between the brackets 60 and 62 is a metal slide bar 64 which carries a bushing 66, the position of which is controlled by a hydraulic cylinder 67. The horizontal position of nozzle 52 relative to vehicle 12 is controlled by extensor mechanism 54, the input ends of the links of which are connected between bushing 66 and fixed pivot point 72. The output or movable ends of the links of extensor mechanism 54 are connected between a fixed pivot 68 and a bushing 74 which rides on slider bar 70 which in turn is fixed between the extending fingers of bracket 78.

A position control system is established by sonar transducers 56 mounted on nozzle 52 and positioned to emit a signal toward the side surfaces of the vehicle 12 and to receive a reflection thereof from the side surfaces of vehicle 12. The transducer output signal is a function of the distance from the transducer to the reflecting surface and is connected to a control circuit 58 which in turn is connected to the hydraulic cylinder 67 to extend and retract nozzle 52 by way of the extensor mechanism 54 to maintain a close but non-contacting spacing between nozzle 52 and vehicle 12.

A series of rollers, similar to rollers 50 shown in FIG. 2, may be mounted to the outlet end of nozzle 52. The rollers permit the nozzle to roll harmlessly along the side surfaces of the vehicle. Further, nozzle 52 may include a series of slits at the nozzle outlet which allow the nozzle material to flex when contacted by vehicle appendages such as mirrors.

FIG. 4 illustrates a variation on the control system of FIG. 3 adapted to provide a smaller air stream for low or conventional height vehicles and a larger, higher air stream for taller vehicles such as vans or busses. The lower nozzle 52a carries a sonar transducer 56a and is extended and retracted for position control relative to a vehicle by means of a first extensor mechanism 54a. A top nozzle 52b carries a sonar transducer 56b which is connected in a control circuit of the type shown in FIG. 3 to extend and retract the extensor mechanism 54b.

Normally, the system is operated for vehicles of conventional height with only the lower nozzle 52a supplied with air. However, when sonar transducer 56b detects the presence of a taller vehicle such as a van, a mechanism such as a baffle is operated to supply air to the upper nozzle 52b to completely dry the sides of the vehicle.

A similar but somewhat different arrangement for accommodating vehicles of different height is shown in FIG. 5. In FIG. 5, a single nozzle 52c is internally divided by means of a baffle 84 and door 82 to provide a smaller and lower air stream for vehicles of conventional height and a higher more distributed air stream for taller vehicles such as vans. Again, the nozzle 52c carries two sonar transducers 56c and 56d. The extension and retraction of the nozzle 52c for proximity control relative to a vehicle is achieved by means of an extensor mechanism 54c which is essentially similar to that shown in FIG. 3. When the sonar transducer 56d detects the presence of a taller vehicle, the normally closed door 82 is opened by means of a control mechanism 80 which may comprise a simple solenoid and pivot arrangement as will be apparent to those skilled in the design of mechanical devices.

It will be apparent to those skilled in the vehicle laundering technology that it is desirable to mount bumpers, cushions and other devices on the dryer mechanism to prevent adverse affects of inadvertent contact between the mechanism and the vehicle surfaces, albeit backup mechanisms are employed to prevent such contact. FIG. 6 discloses an arrangement of plastic boxes 84, 86, 88, and 89 of graduated sizes which telescope into and out of one another as the positioning mechanism 14 is extended and retracted. This preferred arrangement fully enshrouds the metal components of the positioning mechanism; i.e., the scissors arms, and protects the vehicle against inadvertent contact and damage. The top plastic box 84 is mounted to a breakaway bar 91, while the bottom plastic box 89 is mounted to a nozzle 90. The two middle boxes 86 and 88 slide freely within each other and within the top box 84 and bottom box 89.

Figure 6A:
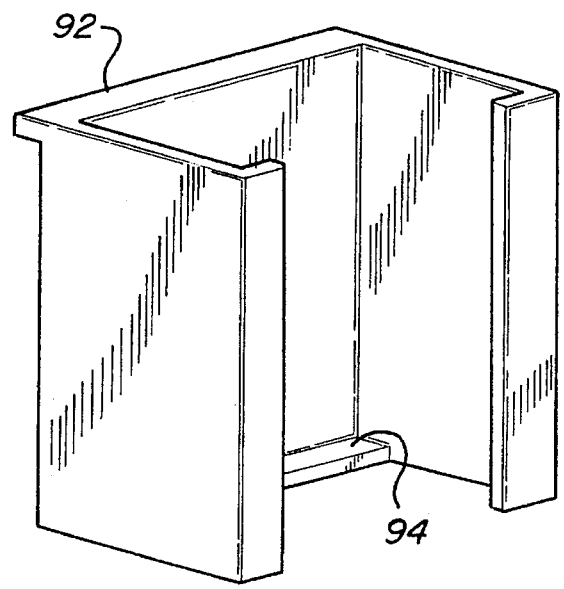
FIG. 6a is a detailed view of one of the box guards of FIG. 6.

Referring to FIG. 6a, projections 92 and 94 prevent the boxes from sliding out of each other. To assemble the telescoping shield, box 86 is dropped inside box 84. The outward projection 92 of box 86 contacts the inward projection 94 of box 84, thereby preventing box 86 from falling further. Similarly, box 88 is dropped inside box 86 and falls until the projections contact each other. Finally, box 89 is dropped inside box 88 until the projections contact one another. A similar arrangement of plastic boxes enshroud the metal components of the side nozzle positioning mechanism. It will be appreciated that other devices such as rubber or plastic bumpers may be mounted on the arms of the positioning mechanism 14 to achieve the same purpose.

Also shown in FIG. 6 is an optional breakaway mechanism 108 which allows the dryer system to pivot away from the vehicle if accidental contact occurs. The breakaway mechanism 108 uses a breakaway bar 91 which is pivotally mounted to the top beam 10a of gantry frame 10 by means of brackets 104 and 106. A breakaway spring 96, mounted between breakaway bar 91 and the top beam 10a allows the dryer system to pivot away from the vehicle when contacted, yet acts to bias the dryer system in a vertical position when not contacted. This breakaway mechanism 108 protects the vehicle if the other protection systems fail. A similar breakaway mechanism allows the side nozzle system to pivot away from the vehicle when contacted. The side breakaway mechanism biases the side nozzle system in a position perpendicular to the vehicle's side surface.

FIG. 7 illustrates the use of a ¼" plastic touch plate 98 depending from the plenum 16 in front of the nozzle 22 by approximately 2 inches. Touch plate 98 is located between nozzle 22 and the approaching vehicle. If a vehicle runs into touch plate 98, the touch plate bends until it contacts a microswitch 100 mounted on nozzle 22. When contact occurs, a retract circuit override 102 is activated which overrides control circuit 30, which normally controls nozzle position, and retracts nozzle 22 to the fully retracted position. This arrangement provides a backup vehicle protection system should the primary sonar proximity detection and control system fail. A similar touch plate and retraction override system is provided for the side nozzle system.

I claim:

1. Apparatus for drying a washed vehicle in a wash lane comprising:

support means disposed adjacent a wash lane;

blower means for producing an air stream;

air conduit means having at least one inlet connected to receive air from said blower means and at least one outlet for directing air against the washed surfaces of a vehicle;

positioning and control means mechanically connecting the air conduit means to the support means and operable to rectilinearly vary the spacing between the support means and said outlets according to location of said surfaces, said positioning and control means having a proximity detection means for sensing the spatial relationship between said air conduit means and a vehicle in said wash lane; said proximity detection means being of the type which emits a signal toward a surface of the vehicle and receives a reflection of said signal from said surface; said positioning means comprises an extendable mechanical scissors mechanism having a series of pivotally connected cross arms; and means for extending and retracting said scissors mechanism.

2. Apparatus as defined in claim 1 wherein said extendable mechanical scissors mechanism comprises a control end and a controlled end, the control end comprising a first cross arm fixed relative to said support means and a second cross arm slidably mounted relative to said support means; said power means being connected between said support and said second arm for extending and retracting said mechanical scissors mechanism; said controlled end comprising a first arm fixed relative to said air conduit means and a second control arm slidably connected to said air conduit means.

3. Apparatus for drying a washed vehicle in a wash lane comprising:

support means disposed adjacent a wash lane;

blower means for producing an air stream;

air conduit means having at least one inlet connected to receive air from said blower means and at least one outlet for directing air against the washed surfaces of a vehicle;

positioning and control means mechanically connecting the air conduit means to the support means and operable to rectilinearly Vary the spacing between the support means and said outlets according to location of said surfaces, said positioning and control means having a proximity detection means for sensing the spatial relationship between said air conduit means and a vehicle in said wash lane; said proximity detection means being of the type which emits a signal toward a surface of the vehicle and receives a reflection of said signal from said surface;

said air conduit means comprises a hollow nozzle member depending from said support means toward said vehicle from a position overhead said vehicle, and a nozzle outlet at the free end thereof for directing air against the surfaces of said vehicle said air conduit means further comprises a plurality of second hollow nozzle members extending from said support means toward said vehicle surfaces from points overhead said vehicle, said second nozzle members having a width which is small in relationship to the vertical length thereof.

4. Apparatus for drying a washed vehicle in a wash lane comprising:

support means disposed adjacent a wash lane;

blower means for producing an air stream;

air conduit means having at least one inlet connected to receive air from said blower means and at least one outlet for directing air against the washed surfaces of a vehicle;

positioning and control means mechanically connecting the air conduit means to the support means and operable to rectilinearly vary the spacing between the support means and said outlets according to location of said surfaces, said positioning and control means having a proximity detection means for sensing the spatial relationship between said air conduit means and a vehicle in said wash lane; said proximity detection means being of the type which emits a signal toward a surface of the vehicle and receives a reflection of said signal from said surface; and guard means mounted on said positioning means for preventing contact of the mechanical surfaces of said positioning means to said vehicle.

5. Apparatus for drying a washed vehicle in a wash lane comprising:

support means disposed adjacent a wash lane;

blower means for producing an air stream;

air conduit means having at least one inlet connected to receive air from said blower means and at least one outlet for directing air against the washed surfaces of a vehicle;

positioning and control means mechanically connecting the air conduit means to the support means and operable to rectilinearly vary the spacing between the support means and said outlets according to location of said surfaces, said positioning and control means having a proximity detection means for sensing the spatial relationship between said air conduit means and a vehicle in said wash lane; said proximity detection means being of the type which emits a signal toward a surface of the vehicle and receives a reflection of said signal from said surface; and a breakaway mechanism pivotally mounted to said support means for allowing said positioning means and said air conduit means to pivot upon contact by said vehicle.

6. Apparatus for drying a washed vehicle in a wash lane comprising:

support means disposed adjacent a wash lane;

blower means for producing an air stream;

air conduit means having at least one inlet connected to receive air from said blower means and at least one outlet for directing air against the washed surfaces of a vehicle;

positioning and control means mechanically connecting the air conduit means to the support means and operable to rectilinearly vary the spacing between the support means and said outlets according to location of said surfaces, said positioning and control means having a proximity detection means for sensing the spatial relationship between said air conduit means and a vehicle in said wash lane; said proximity detection means being of the type which emits a signal toward a surface of the vehicle and receives a reflection of said signal from said surface; and an override mechanism for retracting said air conduit means upon contact by said vehicle.

7. Apparatus for drying a washed vehicle in a wash lane comprising:

support means disposed adjacent a wash lane;

blower means for producing an air stream;

air conduit means having at least one inlet connected to receive air from said blower means and at least one outlet for directing air against the washed surfaces of a vehicle;

positioning and control means mechanically connecting the air conduit means to the support means and operable to rectilinearly vary the spacing between the support means and said outlets according to location of said surfaces, said positioning and control means having a proximity detection means for sensing the spatial relationship between said air conduit means and a vehicle in said wash lane; said proximity detection means being of the type which emits a signal toward a surface of the vehicle and receives a reflection of said signal from said surface; said positioning means is disposed adjacent a side surface of said vehicle; and control means for varying the vertical extent of the air outlet.

8. Apparatus as defined in claim 7 wherein the control means is a baffle inside of the nozzle.

9. Apparatus for drying a washed vehicle comprising:

support means disposed adjacent a wash lane;

blower means for producing an air stream;

air conduit means having at least one inlet connected to receive air from said blower means and at least one outlet for directing air against the wash surfaces of the vehicle, and positioning means mechanically connecting the air conduit means to the support means to rectilinearly vary the spacing between the support means and the outlets according to the location of said surfaces wherein said positioning means comprises an extendable, mechanical scissors mechanism having a series of pivotally connected cross arms.

10. Apparatus as defined in claim 9 wherein said positioning means further comprises a hydraulic cylinder operatively connected to extend and retract the scissors mechanism.

11. Apparatus as defined in claim 9 further including guard means substantially covering said scissors mechanism and comprising a series of telescopically arranged boxes of graduated size.

12. Apparatus for drying a vehicle in a wash location comprising:

support means disposed adjacent the wash lane;

blower means mounted on said support means, and nozzle means positioned adjacent the side surface of a vehicle in said wash lane, and means for varying the vertical extent of the air outlet of said nozzle means according to the height of the vehicle being dried.

13. Apparatus as defined in claim 12 wherein said last mentioned means comprises plural nozzles and means for activating the number of nozzles in said plurality of nozzles according to the height of the vehicle.

14. Apparatus as defined in claim 12 wherein said last mentioned means comprises controllable baffle means internally of said nozzle means for dividing the outlet stream into at least two vertically arranged sections and means for controlling the operation of said baffle means according to the height of the vehicle.

* * * * *